(12) United States Patent
Lu et al.

(10) Patent No.: US 9,522,384 B2
(45) Date of Patent: Dec. 20, 2016

(54) PHOTOCATALYTIC STRUCTURE AND METHOD FOR MANUFACTURING PHOTOCATALYTIC SOL-GELS

(71) Applicant: JM MATERIAL TECHNOLOGY INC., Taoyuan County (TW)

(72) Inventors: Li-Fang Lu, Taoyuan County (TW); Yu-Wen Chen, Taipei (TW)

(73) Assignee: JM MATERIAL TECHNOLOGY INC., Taoyuan County (TW)

( * ) Notice: Subject to any disclaimer, the term of this patent is extended or adjusted under 35 U.S.C. 154(b) by 266 days.

(21) Appl. No.: 14/228,510

(22) Filed: Mar. 28, 2014

(65) Prior Publication Data

US 2014/0296060 A1    Oct. 2, 2014

(30) Foreign Application Priority Data

| Mar. 28, 2013 | (TW) | ............................. | 102205694 U |
| Apr. 26, 2013 | (TW) | ............................. | 102207635 U |
| Dec. 19, 2013 | (TW) | ............................. | 102224034 U |
| Jan. 8, 2014 | (TW) | ............................. | 103100626 A |

(51) Int. Cl.
  *B01J 23/50*   (2006.01)
  *B01J 21/06*   (2006.01)
  (Continued)

(52) U.S. Cl.
  CPC .............. *B01J 23/50* (2013.01); *B01D 53/885* (2013.01); *B01J 21/063* (2013.01); *B01J 21/08* (2013.01); *B01J 35/004* (2013.01); *B01J 35/0013* (2013.01); *B01J 37/0215* (2013.01); *B01J 37/036* (2013.01); *C03C 17/256* (2013.01);
  (Continued)

(58) Field of Classification Search
  None
  See application file for complete search history.

(56) References Cited

U.S. PATENT DOCUMENTS

2009/0110591 A1   4/2009   Guerra

FOREIGN PATENT DOCUMENTS

| CN | 101385967 A | 3/2009 |
| CN | 101913777 A | 12/2010 |
| CN | 102151560 A | 8/2011 |

OTHER PUBLICATIONS

Xu et al, Preparation and characterization of silica-titania aerogel-like balls by ambient pressure drying, 2007, j sol-gel sci techn, 41, 203-207.*

(Continued)

*Primary Examiner* — Melvin C Mayes
*Assistant Examiner* — Stefanie Cohen
(74) *Attorney, Agent, or Firm* — Chun-Ming Shih; HDLS IPR Services

(57) ABSTRACT

The invention provides a photocatalytic structure comprising a carrier and a photocatalytic film formed on the carrier, in which the photocatalytic film comprises titanium dioxide with shape of rhombus particles. The titanium dioxide particle has anatase structure. The titanium dioxide particle is rhombus with a major axis 10-15 nm and minor axis 3-6 nm. The photocatalytic film which is formed by titanium dioxide with shape of rhombus particles has a high overall photocatalytic activity so that the effects of stainproofing and self-cleaning can be improved. The invention also relates to a method for manufacturing photocatalytic sol-gels.

9 Claims, 2 Drawing Sheets

(51) Int. Cl.
*B01J 21/08* (2006.01)
*B01J 37/03* (2006.01)
*B01J 35/00* (2006.01)
*B01J 37/02* (2006.01)
*C03C 17/25* (2006.01)
*B01D 53/88* (2006.01)
*B01J 35/02* (2006.01)
*B01J 35/10* (2006.01)

(52) U.S. Cl.
CPC .............. *B01D 2255/104* (2013.01); *B01D 2255/20707* (2013.01); *B01D 2255/802* (2013.01); *B01D 2255/9202* (2013.01); *B01J 35/023* (2013.01); *B01J 35/10* (2013.01)

(56) References Cited

OTHER PUBLICATIONS

Zhao et al, Ag/TiO2 sol prepared by a sol—gel method and its photocatalytic activity, 2011, Journal of Physics and Chemistry of Solids, 72, 1312-1218.*

Office Action dated Dec. 4, 2015 of the corresponding China patent application.

* cited by examiner

US 9,522,384 B2

PHOTOCATALYTIC STRUCTURE AND METHOD FOR MANUFACTURING PHOTOCATALYTIC SOL-GELS

BACKGROUND OF THE INVENTION

Field of the Invention

The present invention generally relates to a photocatalytic structure, in particular to a photocatalytic film containing titanium dioxide with shape of rhombus particles.

Description of Related Art

Photocatalysts are materials in which, when exposed to light, electron-hole pairs are formed that generate highly reactive free radicals on the material surface. Titanium dioxide is a material of this kind, and most frequently used to make photocatalysts due to high oxidizing ability, high chemical stability and non-toxic property thereof. It is known practice to use photocatalysts to remove harmful chemicals with low concentration in the air without releasing harmful materials. Therefore, photocatalysts are excellent catalysts used in environmental clean-up application. Photocatalysts have antibacterial, deodorizing and stainproofing functions and the use of removing harmful substances. However, the antibacterial effect of photocatalysts under ultraviolet light at wavelength of 365 nm is limited, and the antibacterial effect of photocatalysts cannot be exhibited without UV light.

There are three kinds of titanium dioxide crystallic structures with rutile type and anatase type of tetragonal system, and brookite type of rhomic system, in which only titanium dioxide with the anatase type has photocatalytic effect. The principle of photocomposition of photocatalysis is described. Titanium oxide has the property of absorbing ultraviolet light at wavelengths below approximately 400 nm or sunlight and producing an excited electron. When the generated electron and hole reach the particle surface, combinations with oxygen and water and the like generate a variety of different radicals. These radicals typically cause an oxidizing action, and oxidize and decompose substances adsorbed to the surface thereof. The use of the optical functions of ultrafine particles of titanium oxide in antibacterial, deodorizing and stainproofing applications, and in environmental clean-up applications such as atmospheric purification and water quality purification are currently under investigation.

A powdery titanium dioxide can be added into waste water directly to decompose organic substances therein, or coated on the surface of a carrier to decompose organic substances in the air by exposing to UV light. However, those methods have problems such that it is troublesome to recycle the powdery titanium dioxide, and a part of surface area of the photocatalyst cannot be irradiated by UV light. In order to solve those problems, a titanium dioxide film can be used to increase the surface area that may be exposed to UV light, and thus the effect of photocatalysis can be increased.

Conventionally, titanium dioxide with shape of sphere particles has been used as a photocatalyst. However, a photocatalytic film which is formed by titanium dioxide with shape of sphere particles has a poor overall photocatalytic activity. Because the space formed among the sphere particles is large, less amount of titanium dioxide with shape of sphere particles can be contained in a unit of volume. Also, titanium dioxide with shape of sphere particles has a poor photocatalytic activity. Therefore, there is a need to enhance the properties of the photocatalytic film.

SUMMARY OF THE INVENTION

The present invention is provided to solve the problems of the prior art. One primary object and purpose of the invention is to provide a photocatalytic structure having a photocatalytic film and a carrier in which the photocatalytic film comprises titanium dioxide with shape of rhombus particles. Because the space formed among the rhombus particles is small, large amount of titanium dioxide with shape of rhombus particles can be contained in a unit of volume. Therefore, a photocatalytic film which is formed by titanium dioxide with shape of rhombus particles has a high overall photocatalytic activity so that the effects of stainproofing and self-cleaning can be improved.

Another object of the invention is to provide a photocatalytic structure having a photocatalytic film and a carrier in which the photocatalytic film comprises titanium dioxide with shape of rhombus particles and silica with shape of sphere particles. The titanium dioxide with shape of rhombus particles and silica with shape of sphere particles are mixed homogeneously and formed on the carrier. The photocatalytic film exhibits excellent antireflection and antiglare properties.

Still another object of the invention is to provide a photocatalytic structure combining nano silver particles and titanium dioxide with shape of rhombus particles. The nano silver particles are provided to maintain a basic antibacterial effect when antibacterial the effect of photocatalysts cannot be exhibited without UV light. On the other hand, the functions of stainproofing and self-cleaning of photocatalysts are provided to reduce the biofilm deposition on the surface of the nano silver particles.

In order to fulfill the object and purpose described above, an aspect of the invention provides a photocatalytic structure comprising a carrier and a photocatalytic film, for example titanium dioxide film formed on the carrier in which the photocatalytic film comprises titanium dioxide with shape of rhombus particles.

Another aspect of the invention provides a photocatalytic structure comprising a carrier and a photocatalytic film, for example titanium dioxide-silica film formed on the carrier in which the photocatalytic film comprises titanium dioxide with shape of rhombus particles and silica with shape of sphere particles. The titanium dioxide with shape of rhombus particles and silica with shape of sphere particles are mixed homogeneously and formed on the carrier.

Still another aspect of the invention provides a photocatalytic structure comprising a carrier and a photocatalytic film, for example a photocatalytic film containing titanium dioxide particles and nano silver particles formed on the carrier in which the photocatalytic film comprises titanium dioxide with shape of rhombus particles and nano silver particles with shape of sphere particles.

The use of titanium dioxide with shape of rhombus particles and silica or nano silver particles truly can enhance the properties of the photocatalytic film.

The invention also relates to a method for manufacturing photocatalytic sol-gels. In an aspect, the method comprises steps: dissolving titanium tetrachloride in an aqueous solution of hydrogen chloride at 0-5° C.; adding an ammonia solution to form titanium tetrahydroxy colloidal solution; washing titanium tetrahydroxy colloidal solution by water until no chloride ion contained (determining method: titration with silver nitrate until no white precipitate of silver chloride); adding hydrogen peroxide solution into the titanium tetrahydroxy colloidal solution; and heating a period of time between 60-100° C. to obtain titanium dioxide photocatalytic sol-gels. The transparent titanium dioxide photocatalytic sol-gels can be coated on any carriers such as glass, ceramics and resin sheet to form a photocatalytic film. The photocatalytic film can exhibit high photocatalytic activity, when exposed to UV light or fluorescent lamp. The photocatalytic film has stainproofing, self-cleaning, antibacterial and super-hydrophilic functions.

In addition, in another aspect, silica sol-gels can be added after the step of adding hydrogen peroxide solution of the above method to obtain titanium dioxide-silica sol-gels. Further, in still another aspect, silver nitrate solution can be added after the step of adding hydrogen peroxide solution of the above method to obtain titanium dioxide-nano silver composite sol-gels. The method for manufacturing photocatalytic sol-gel of the invention uses hydrogen peroxide as a reinforcing agent of photocatalysts to extend and enhance removing efficiency. After hydrogen peroxide reacts with photocatalysts, only water is produced, not to reduce the removing efficiency of photocatalysts with remaining impurities such as potassium ions by using potassium permanganate.

DETAILED DESCRIPTION OF THE INVENTION

In cooperation with attached drawings, the technical contents and detailed description of the present invention are described thereinafter according to a preferable embodiment, being not used to limit its executing scope.

Figure 1:
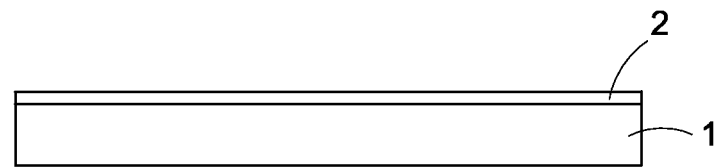
FIG. 1 shows schematically drawn a cross sectional structure of a photocatalytic structure of the invention.
Figure 2:
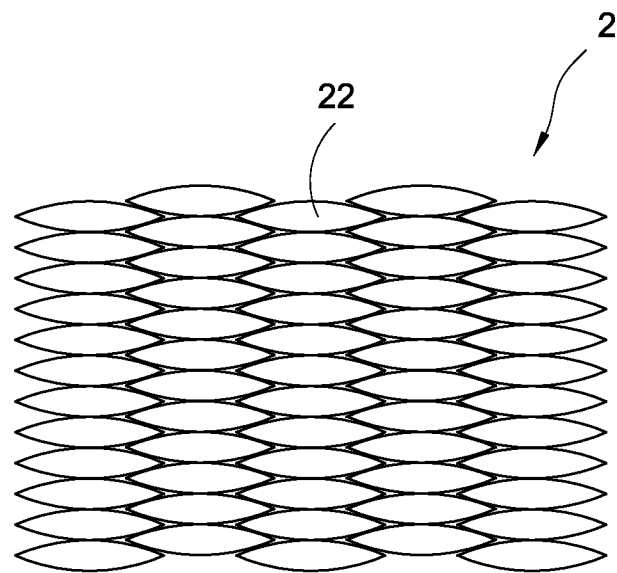
FIG. 2 shows schematically drawn a structure of a titanium dioxide photocatalytic film of the invention.

Please refer to FIGS. 1 and 2. FIG. 1 shows schematically drawn a cross sectional structure of a photocatalytic structure of the invention. FIG. 2 shows schematically drawn a structure of a titanium dioxide photocatalytic film of the invention. As shown in FIGS. 1 and 2. The invention provides a photocatalytic structure comprising a carrier 1 and a photocatalytic film 2, for example titanium dioxide film formed on the carrier 1 in which the photocatalytic film 2 comprises titanium dioxide with shape of rhombus particles 22. The photocatalytic film 2 has a thickness less than 1 millimeter. The titanium dioxide particle 22 has anatase structure. The titanium dioxide particle 22 is rhombus with a major axis 10-15 nm and minor axis 3-6 nm. Compared to the conventional titanium dioxide with shape of sphere particles, titanium dioxide with shape of rhombus particles 22 has high photocatalytic activity. The carrier 1 may be a transparent glass or resin material. Because the space formed among the rhombus particles is small, large amount of titanium dioxide with shape of rhombus particles can be contained in a unit of volume. Therefore, a photocatalytic film which is formed by titanium dioxide with shape of rhombus particles has a high overall photocatalytic activity so that the effects of stainproofing and self-cleaning can be improved.

Figure 3:
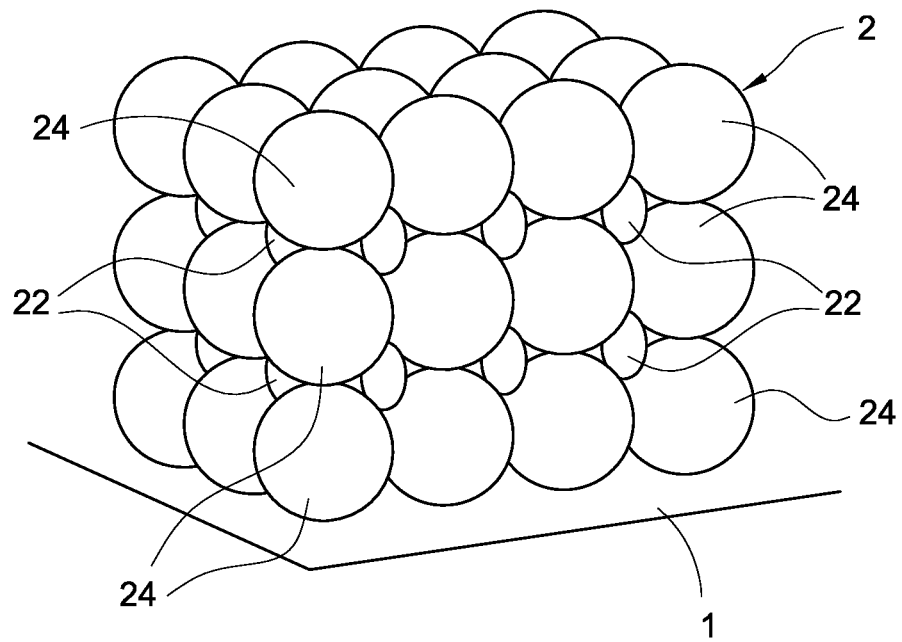
FIG. 3 shows schematically drawn a structure of a titanium dioxide-silica photocatalytic film of the invention.

Next, please refer to FIGS. 1 and 3. FIG. 3 shows schematically drawn a structure of a titanium dioxide-silica photocatalytic film of the invention. As shown in FIGS. 1 and 3. The invention provides a photocatalytic structure comprising a carrier 1 and a photocatalytic film 2, for example titanium dioxide-silica film formed on the carrier 1 in which the photocatalytic film 2 comprises titanium dioxide with shape of rhombus particles 22 and silica with shape of sphere particles 24. The titanium dioxide with shape of rhombus particles 22 and silica with shape of sphere particles 24 are mixed homogeneously and formed on the carrier 1. The silica with shape of sphere particles 24 are arranged to be a cube in the photocatalytic film 2. The titanium dioxide with shape of rhombus particles 22 are located in the space formed among the silica with shape of sphere particles 24. The photocatalytic film 2 has a thickness less than 1 millimeter. The titanium dioxide particle 22 has anatase structure. The titanium dioxide particle 22 is rhombus with a major axis 10-15 nm and minor axis 3-6 nm. Compared to the conventional titanium dioxide with shape of sphere particles, titanium dioxide with shape of rhombus particles 22 has high photocatalytic activity. The silica with shape of sphere particle has a diameter between 20 to 30 nanometers. The thickness of the photocatalytic film can be increased, and the refractive index and void ratio of the photocatalytic film can be changed by adding silica, and therefore the travel path of the light in the photocatalytic film may be affected, which can increase the transmission rate. The carrier 1 may be a transparent glass or resin material. Because the space formed among the rhombus particles is small, large amount of titanium dioxide with shape of rhombus particles can be contained in a unit of volume. Therefore, a photocatalytic film which is formed by titanium dioxide with shape of rhombus particles has a high overall photocatalytic activity so that the effects of stainproofing and self-cleaning can be improved.

Figure 4:
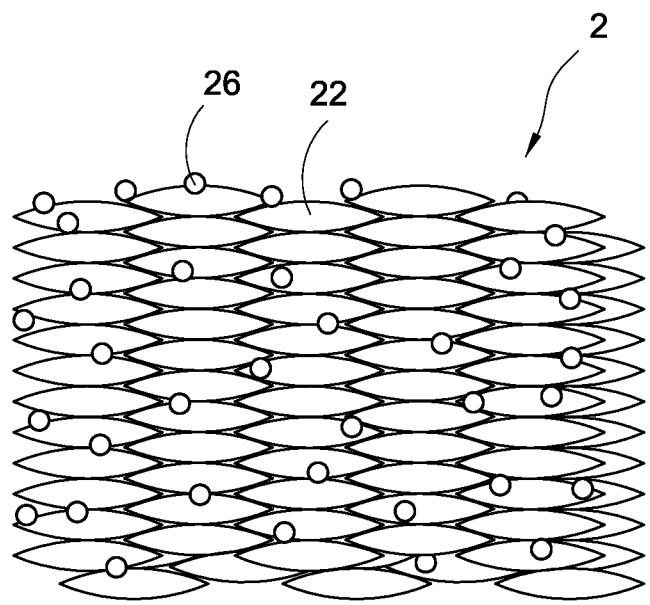
FIG. 4 shows schematically drawn a structure of a titanium dioxide-nano silver composite photocatalytic film of the invention.

Next, please refer to FIGS. 1 and 4. FIG. 4 shows schematically drawn a structure of a titanium dioxide-nano silver composite photocatalytic film of the invention. As shown in FIGS. 1 and 4. The invention provides a photocatalytic structure comprising a carrier 1 and a photocatalytic film 2, for example a photocatalytic film 2 containing titanium dioxide particles 22 and nano silver particles 26 formed on the carrier 1 in which the photocatalytic film 2 comprises titanium dioxide with shape of rhombus particles 22 and nano silver particles 26 with shape of sphere particles. The photocatalytic film 2 has a thickness less than 1 millimeter. The titanium dioxide particle 22 has anatase structure. The titanium dioxide particle 22 is rhombus with a major axis 10-15 nm and minor axis 3-6 nm. Compared to the conventional titanium dioxide with shape of sphere particles, titanium dioxide with shape of rhombus particles 22 has high photocatalytic activity. The nano silver particle 26 with shape of sphere particle has a diameter less than 100 nanometers. The nano silver particles 26 adhere to the surface of the titanium dioxide particles 22. The carrier 1 may be a transparent glass or resin material. The nano silver particles 26 are provided to maintain a basic antibacterial effect when antibacterial the effect of photocatalysts cannot be exhibited without UV light. On the other hand, the functions of stainproofing and self-cleaning of photocatalysts are provided to reduce the biofilm deposition on the surface of the nano silver particles 26. Therefore, a photocatalytic film that is formed by titanium dioxide with shape of rhombus particles 22 and the nano silver particles 26 has a high overall photocatalytic activity so that the effects of stainproofing and self-cleaning can be improved.

The invention provides a method for manufacturing a photocatalytic structure. The method comprises cleaning process and film plating process. The surface of the carrier which has not been cleaned may has oil or other dirt that may result in an uneven coating and flakes when drying. In order for titanium dioxide particles to adhere to the surface of the carrier, the cleaning process is necessary. The cleaning process comprises steps: depositing a carrier in a neutral detergent, and cleaning the carrier by ultrasonic vibration for 1 hour; removing the residual neutral detergent on the surface of the carrier by deionized water, and cleaning the carrier by ultrasonic vibration for 1 hour; depositing a carrier in NaOH solution, and cleaning the carrier by ultrasonic vibration for 1 hour; removing the residual NaOH solution on the surface of the carrier by deionized water, and cleaning the carrier by ultrasonic vibration for 1 hour; and drying the carrier in an oven.

The film plating process comprises steps: fastening the carrier on a fixture of an elevating device; immersing the carrier into a coating liquid with a descending speed of 5-10 cm/min; elevating the carrier to form a film on the surface thereof with an elevating speed of 5-10 cm/min; exposing to UV light for 30 minutes; and drying the carrier with the film at 60-160° C. in an oven. As manufacturing multilayer films, the above steps may be repeated. The coating liquid may comprise titanium dioxide photocatalytic sol-gel, titanium dioxide-silica photocatalytic sol-gel or titanium dioxide-nano silver photocatalytic sol-gel.

The invention also relates to a method for manufacturing photocatalytic sol-gels that can be used for forming a photocatalytic film. In an embodiment, the method comprises steps: dissolving titanium tetrachloride in an aqueous solution of hydrogen chloride at 0-5° C. to form an A solution; adding an ammonia solution to A solution to form titanium tetrahydroxy colloidal solution with pH 7-12; washing titanium tetrahydroxy colloidal solution by water until no chloride ion contained (determining method: titration with silver nitrate until no white precipitate of silver chloride); and adding hydrogen peroxide solution into the titanium tetrahydroxy colloidal solution by molar ratio of hydrogen peroxide to titanium being 2:1~5:1 to form a B solution with a ratio of solid weight of titanium dioxide to water being 0.01%-2%; and heating B solution for a period of time between 60-100° C. until all colloids disappear by hydrolysis to obtain transparent titanium dioxide photocatalytic sol-gels. The transparent titanium dioxide photocatalytic sol-gels can be coated on any carriers such as glass, ceramics and resin sheet to form a photocatalytic film. The photocatalytic film can exhibit high photocatalytic activity, when exposed to UV light or fluorescent lamp. The photocatalytic film has stainproofing, self-cleaning, antibacterial and super-hydrophilic functions.

In another embodiment, the invention also relates to a method for manufacturing photocatalytic sol-gels that can be used for forming a photocatalytic film. In an embodiment, the method comprises steps: dissolving titanium tetrachloride in an aqueous solution of hydrogen chloride at 0-5° C. to form an A solution; adding an ammonia solution to A solution to form titanium tetrahydroxy colloidal solution with pH 7-12; washing titanium tetrahydroxy colloidal solution by water until no chloride ion contained (determining method: titration with silver nitrate until no white precipitate of silver chloride); adding hydrogen peroxide solution into the titanium tetrahydroxy colloidal solution by molar ratio of hydrogen peroxide to titanium being 2:1~5:1 to form a B solution with a ratio of solid weight of titanium dioxide to water being 0.01%-2%; adding silica sol-gels into B solution by weight ration of silica to titanium dioxide being 0.5:1~4:1; and heating B solution having silica sol-gels for a period of time between 60-100° C. until all colloids disappear by hydrolysis to obtain transparent titanium dioxide-silica photocatalytic sol-gels. The transparent titanium dioxide-silica photocatalytic sol-gels can be coated on any carriers such as glass, ceramics and resin sheet to form a photocatalytic film. The photocatalytic film can exhibit high photocatalytic activity, when exposed to UV light or fluorescent lamp. The photocatalytic film has stainproofing, self-cleaning, antibacterial and super-hydrophilic functions.

In still another embodiment, the invention also relates to a method for manufacturing photocatalytic sol-gels that can be used for forming a photocatalytic film. In an embodiment, the method comprises steps: dissolving titanium tetrachloride in an aqueous solution of hydrogen chloride at 0-5° C. to form an A solution; adding an ammonia solution to A solution to form titanium tetrahydroxy colloidal solution with pH 7-12; washing titanium tetrahydroxy colloidal solution by water until no chloride ion contained (determining method: titration with silver nitrate until no white precipitate of silver chloride); adding hydrogen peroxide solution into the titanium tetrahydroxy colloidal solution by molar ratio of hydrogen peroxide to titanium being 2:1~5:1 to form a B solution with a ratio of solid weight of titanium dioxide to water being 0.01%-2%; adding a solution of silver nitrate into B solution by weight ratio of silver nitrate to titanium dioxide being 0.01%-10%; and heating B solution having silver for a period of time between 60-100° C. until all colloids disappear by hydrolysis to obtain transparent titanium dioxide-nano silver photocatalytic sol-gels. The transparent titanium dioxide-nano silver photocatalytic sol-gels can be coated on any carriers such as glass, ceramics and resin sheet to form a photocatalytic film. The photocatalytic film can exhibit high photocatalytic activity, when exposed to UV light or fluorescent lamp. The photocatalytic film has stainproofing, self-cleaning, antibacterial and super-hydrophilic functions.

The methods for manufacturing photocatalytic sol-gels of the invention use hydrogen peroxide as a reinforcing agent of photocatalysts to extend and enhance removing efficiency. After hydrogen peroxide reacts with photocatalysts, only water is produced, not to reduce the removing efficiency of photocatalysts with remaining impurities such as potassium ions by using potassium permanganate.

The photocatalytic sol-gels of the invention also have anti-virus effect. In the embodiments 1, 2 and 3, 2.5 wt % of the titanium dioxide photocatalytic sol-gel, 2.5 wt % of titanium dioxide-silica photocatalytic sol-gel and 2.5 wt % of titanium dioxide-nano silver photocatalytic sol-gel can be respectively added in three photocatalytic films. The anti-virus rates of the three photocatalytic films all are 99.9% by testing the anti-virus property of the three photocatalytic films based on the standard method of ASTM E 1052-96. In contrast, in a comparative example, a film without adding photocatalytic sol-gel has a zero anti-virus rate by testing the anti-virus property of the film based on the standard method of ASTM E 1052-96.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A photocatalytic structure comprising a carrier and a photocatalytic film formed on the carrier, in which the photocatalytic film comprises titanium dioxide in the shape of rhombus particles, wherein the titanium dioxide in the shape of rhombus particle has a major axis 10-15 nm and minor axis 3-6 nm.

2. The photocatalytic structure as claimed in claim 1, wherein the photocatalytic film has a thickness less than 1 millimeter.

3. The photocatalytic structure as claimed in claim 1, wherein the carrier is a transparent glass or resin material.

4. A photocatalytic structure comprising a carrier and a photocatalytic film formed on the carrier, in which the photocatalytic film comprises titanium dioxide in the shape of rhombus particles and silica in the shape of sphere particles wherein the film is made by mixing titanium dioxide in the shape of rhombus particles and silica in the shape of sphere particles homogeneously and forming the film on the carrier, wherein the titanium dioxide with shape of rhombus particle has a major axis 10-15 nm and minor axis 3-6 nm.

5. The photocatalytic structure as claimed in claim 4, wherein the silica in the shape of sphere particle has a diameter between 20-30 nanometer.

6. The photocatalytic structure as claimed in claim 4, wherein the photocatalytic film has a thickness less than 1 millimeter.

7. A photocatalytic structure comprising a carrier and a photocatalytic film formed on the carrier, in which the photocatalytic film comprises titanium dioxide in the shape of rhombus particles and nano silver particles, wherein the titanium dioxide in the shape of rhombus particle has a major axis 10-15 nm and minor axis 3-6 nm.

8. The photocatalytic structure as claimed in claim 7, wherein each of the nano silver particles has a shape of a sphere with a diameter less than 100 nanometer.

9. The photocatalytic structure as claimed in claim 7, wherein the photocatalytic film has a thickness less than 1 millimeter.

* * * * *

UNITED STATES PATENT AND TRADEMARK OFFICE
CERTIFICATE OF CORRECTION

PATENT NO.         : 9,522,384 B2
APPLICATION NO.    : 14/228510
DATED              : December 20, 2016
INVENTOR(S)        : Lu et al.

Page 1 of 1

It is certified that error appears in the above-identified patent and that said Letters Patent is hereby corrected as shown below:

(72) Inventors should read: Li-Fang Lu, Taoyuan City (TW);
                                 Yu-Wen Chen, Taoyuan County (TW)

Signed and Sealed this
Second Day of April, 2019

Andrei Iancu
*Director of the United States Patent and Trademark Office*